Figure 1:
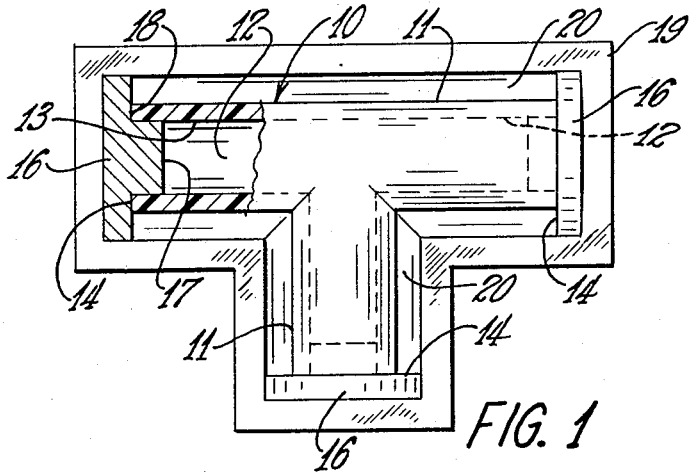
Figure 2:
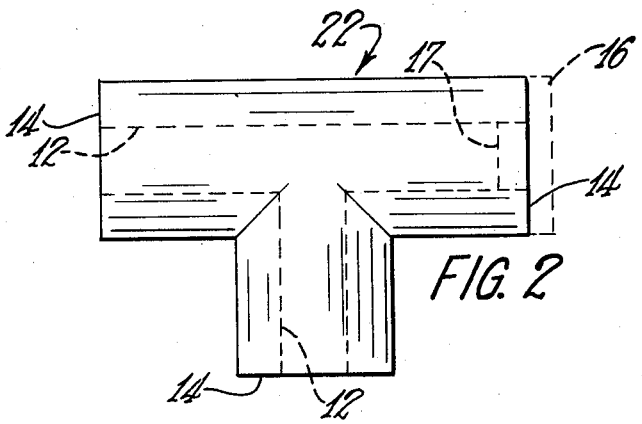
Figure 3:
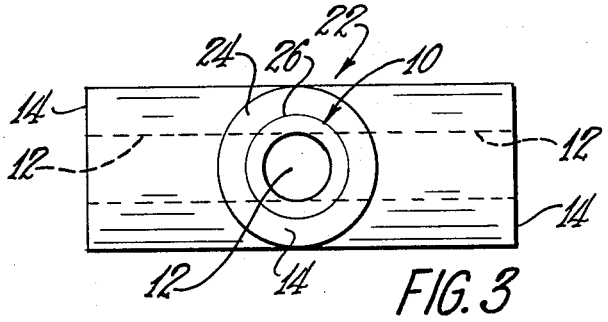

United States Defensive Publication [19] (H) [11] T100,802

Vockel, Jr. [43] Jul. 7, 1981

[54] COMPOSITE PIPE FITTINGS AND THE PRODUCTION THEREOF

[76] Inventor: Richard L. Vockel, Jr., 151 Highgate St., Granville, Ohio 43023

[21] Appl. No.: 152,278

[22] Filed: May 22, 1980

Related U.S. Application Data

[63] Continuation of Ser. No. 973,824, Dec. 27, 1978, abandoned.

[51] Int. Cl.[3] ..... F16L 41/00

[52] U.S. Cl. ..... 285/156; 285/423; 285/DIG. 16; 285/55

[57] ABSTRACT

A composite pipe fitting and a method for producing it are provided by encasing a thermoplastic pipe fitting in a thermosetting material reinforced with discrete fibers with an adhesive material intermediate the thermoplastic pipe fitting and thermosetting material bonding the thermoplastic pipe fitting to the thermosetting material.

1 Claim, 1 Sheet Drawing,

12 Pages Specification

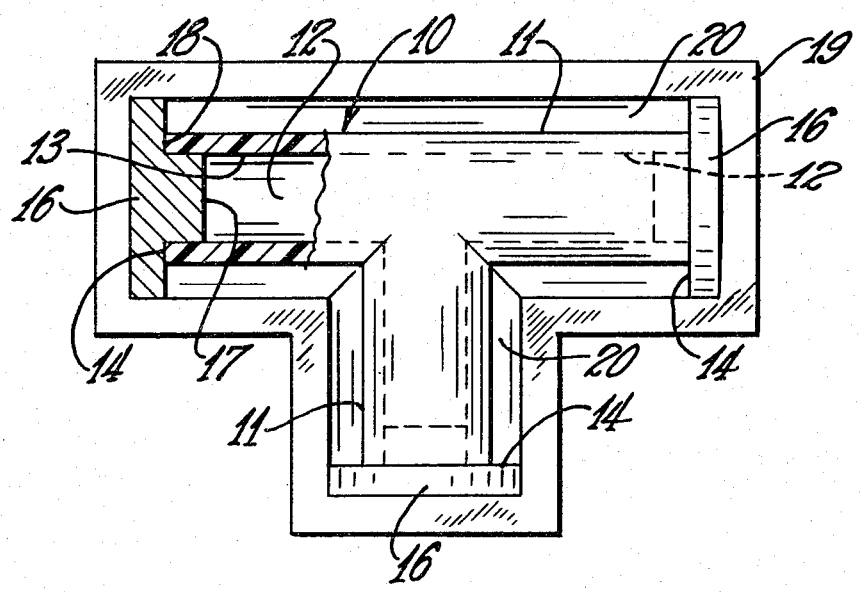

The file of this unexamined application may be inspected and copies thereof may be purchased (849 O.G. 1221, Apr. 9, 1968).